(12) United States Patent
Wang et al.

(10) Patent No.: US 8,275,023 B2
(45) Date of Patent: Sep. 25, 2012

(54) METHOD AND APPARATUS FOR SHARED PARAMETER ESTIMATION IN A GENERALIZED RAKE RECEIVER

(75) Inventors: Yi-Pin Eric Wang, Cary, NC (US);
Carmela Cozzo, Cary, NC (US);
Gregory E. Bottomley, Cary, NC (US);
Gunnar Peters, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 901 days.

(21) Appl. No.: 11/609,395

(22) Filed: Dec. 12, 2006

(65) Prior Publication Data

US 2007/0189364 A1 Aug. 16, 2007

Related U.S. Application Data (63) Continuation-in-part of application No. 11/276,069, filed on Feb. 13, 2006.

(60) Provisional application No. 60/825,441, filed on Sep. 13, 2006.

(51) Int. Cl.
*H04B 1/00* (2006.01)
(52) U.S. Cl. ........ 375/150; 375/142; 375/148; 375/316; 375/340; 375/343
(58) Field of Classification Search ............... 375/136, 375/137, 147–150, 316, 324, 341, 343, 346, 375/349, 219, 242, 306, 152, 271, 285, 322, 375/340
See application file for complete search history.

(56) References Cited

U.S. PATENT DOCUMENTS

| 6,714,585 | B1 | 3/2004 | Wang et al. |
| 7,586,975 | B2 * | 9/2009 | Ryu et al. ............. 375/144 |
| 2002/0051433 | A1 * | 5/2002 | Affes et al. ............. 370/335 |
| 2004/0028013 | A1 * | 2/2004 | Fitton et al. ............. 370/335 |
| 2004/0090906 | A1 * | 5/2004 | Moshavi et al. ............. 370/208 |
| 2005/0025262 | A1 * | 2/2005 | Tanabe et al. ............. 375/341 |
| 2005/0069023 | A1 | 3/2005 | Bottomley et al. |

(Continued)

FOREIGN PATENT DOCUMENTS
WO 2005096517 A1 10/2005

OTHER PUBLICATIONS

Bottomley, G. E. et al. "Coherent Rake Reception using Noisy Channel Estimates." 2004 IEEE 60th Vehicular Technology Conference (VTC2004-Fall), Sep. 26-29, 2004, vol. 3, pp. 1801-1805.

(Continued)

*Primary Examiner* — Hirdepal Singh
(74) *Attorney, Agent, or Firm* — Coats & Bennett, P.L.L.C.

(57) ABSTRACT

Signal impairment correlations for multiple signals in a received multipath signal are constructed by fitting parametric models associated with each high-data-rate signal in the multipath against measured impairment correlations. The estimated model fitting parameters are applied to form impairment correlation estimates for all signals. The models comprise a separate impairment covariance matrix scaled by a model fitting parameter for each high-data-rate signal and a noise covariance matrix scaled by a noise element model fitting parameter. The model fitting parameters may be estimated by a least-squares formulation and applied to form impairment correlation estimates for all signals of interest. The resulting impairment correlation estimates may be provided to G-RAKE receivers or joint scaling demodulators to demodulate the signals while suppressing interference from the high-data-rate signals.

28 Claims, 5 Drawing Sheets

U.S. PATENT DOCUMENTS

| | | | |
|---|---|---|---|
| 2005/0201447 | A1 | 9/2005 | Cairns et al. |
| 2005/0215218 | A1* | 9/2005 | Bottomley et al. ........ 455/226.1 |
| 2006/0007990 | A1* | 1/2006 | Cozzo et al. .................. 375/148 |
| 2007/0098048 | A1 | 5/2007 | Bottomley et al. |
| 2007/0116100 | A1* | 5/2007 | Lindoff et al. ................ 375/148 |
| 2007/0263704 | A1* | 11/2007 | Nagarajan et al. ............ 375/148 |
| 2008/0101443 | A1* | 5/2008 | Lindoff et al. ................ 375/148 |

OTHER PUBLICATIONS

Bottomley, Gregory E. and Cozzo, Carmela, "Method and Apparatus for Iteratively Calculating Channel Response Estimates." Filed Oct. 3, 2006, 22 pages, U.S. Appl. No. 11/538,074.

Cozzo et. al., "Method and Apparatus for Canceling Interference From High Power, High Data Rate Signals." Filed Apr. 22, 2005, 28 pages, U.S. Appl. No. 11/112,578.

Eriksson et al., "Reduced Complexity Interference Suppression for Wireless Communications." Filed Feb. 13, 2005, 30 pages, U.S. Appl. No. 11/276,068.

Frank, Colin D. et. al., Adaptive Interference Suppression for the Downlink of a Direct Sequence CDMA System with Long Spreading Sequences. Journal of VLSI Signal Processing, Jan.-Mar. 2002, pp. 273-291, vol. 30, Kluwer Academic Publishers, The Netherlands.

Wang, Yi-Pin Eric and Bottomley, Gregory E., "DS-CDMA Downlink System Capacity Enhancement through Interference Suppression." IEEE Transactions on Wireless Communications, Jul. 2006, pp. 1767-1774, vol. 5, No. 7.

Mahram-Hadinejad, Hafez, "On the Equivalence of Linear MMSE Chip-Level Equalizer and Generalized RAKE." IEEE Communication Letters, Jan. 2004, pp. 7-8, vol. 8, No. 1.

Wong, T. F. et al. "A Linear Receiver for Direct-Sequence Spread-Spectrum Multiple-Access Systems with Antenna Arrays and Blind Adaptation." IEEE Transactions on Information Theory, vol. 44, No. 2, Mar. 1998, pp. 659-676.

Bottomley, G. E. et al. "Coherent Rake Reception using Noisy Channel Estimates," 2004 IEEE 60th Vehicular Technology Conference (VTC2004-Fall), Sep. 26-29, 2004, vol. 3, pp. 1801-1805.

Bottomley, G. Et. et al. "Method and Apparatus for Code Power Parameter Estimation for Received Signal Processing," Co-pending U.S. Appl. No. 11/935,840, filed Nov. 7, 2007. (Previously cited on Nov. 13, 2007 but applicant failed to include copy of application.).

* cited by examiner

METHOD AND APPARATUS FOR SHARED PARAMETER ESTIMATION IN A GENERALIZED RAKE RECEIVER

This application is a continuation-in-part of U.S. patent Ser. No. 11/276,069, REDUCED COMPLEXITY INTERFERENCE SUPPRESSION FOR WIRELESS COMMUNICATIONS, filed Feb. 13, 2006, which is incorporated herein by reference in its entirety. The new matter of this application claims priority to provisional application Ser. No. 60/825,441, filed Sep. 13, 2006.

BACKGROUND OF THE INVENTION

The present invention generally relates to wireless communication systems, and in particular to minimizing interference from high-data-rate users in the uplink.

Wireless communication systems are widely deployed, providing voice and data communication services to mobile users. As wireless communication technology advances, mobile users may send and receive a wide variety of data—such as audio, video, images, e-mail, web browser content, and the like—in addition to traditional voice communications. Many such data transfers require much higher bandwidth than does digitally encoded voice. For example, enhanced uplink (EUL) packet access has been introduced in Wideband Code Division Multiple Access (WCDMA) 3GPP Release 6. With EUL, a packet bit rate as high as 5.76 Mb/sec is possible on the uplink (data transmission from a mobile terminal to a base station).

The required received power level at the base station (and consequently the power level at which each mobile terminal must transmit its signal) is proportional to the transmission data rate. Typically, there will be a large number of voice users transmitting at a low data rate on the uplink, simultaneously with a small number of high-data-rate users. In this case, the low-data-rate signals are subject to severe interference from the higher-power, high-data-rate signals. Similarly, a high-data-rate user is subject to severe interference from another high-data-rate user.

Several approaches are known for reducing or eliminating this interference. U.S. patent application Ser. No. 11/112,578, METHOD AND APPARATUS FOR CANCELING INTERFERENCE FROM HIGH-POWER, HIGH DATA RATE SIGNALS, filed Apr. 22, 2005, assigned to the assignee of the present application and incorporated herein by reference in its entirety, discloses a successive interference cancellation scheme. High-data-rate signals are detected first. When a high-data-rate signal is correctly detected (as indicated by, e.g., CRC checks), the receiver regenerates the high-data-rate signal and removes it from the received signal. The low-data-rate signals can then be detected based on the reduced-interference version of the received signal.

The parent U.S. patent application to the present application, Ser. No. 11/276,069, REDUCED COMPLEXITY INTERFERENCE SUPPRESSION FOR WIRELESS COMMUNICATIONS, filed Feb. 13, 2005, assigned to the assignee of the present application and incorporated herein by reference in its entirety, discloses a variety of schemes for sharing statistical interference information among multiple users. In one or more embodiments, interference from high-data-rate signals is treated as colored noise, and suppressed in a whitening matched filter, such as a Generalized RAKE receiver or chip equalizer.

RAKE receivers are well known in the communication arts and find widespread use in CDMA systems, such as in IS-95, IS-2000 (cdma2000), and WCDMA wireless communication networks. The name derives from the rake-like appearance of such receivers, wherein multiple, parallel receiver fingers are used to receive multiple signal images in a received multipath signal. By coherently combining the finger outputs in a weighted RAKE combiner, the conventional RAKE receiver can use multipath reception to improve the Signal-to-Noise Ratio (SNR) of the received multipath signal. RAKE receivers model interference as white noise, and work best when the interference and noise to be suppressed is white. A Generalized RAKE (G-RAKE) receiver improves interference suppression performance over a conventional RAKE receiver under some conditions (such as colored interference/noise) by increasing the sophistication of combining weight generation.

In the G-RAKE architecture, the combining weight calculations consider correlations of one or more signal impairments across RAKE fingers. For example, a G-RAKE receiver may track high-data-rate signal interference correlations across those fingers. G-RAKE receivers also may include a comparatively larger number of fingers such that extra fingers may be positioned off of the signal path delays. By using knowledge of how selected signal impairments are correlated across fingers, the G-RAKE receiver can compensate the finger combining weights such that receiver interference suppression performance is improved.

Conventionally, G-RAKE combining weights can be formulated as $$w = R_u^{-1} h \quad (1)$$

where $R_u$ is an impairment covariance matrix and h is the net response. The G-RAKE combining weight is within a scaling factor of the tap coefficients of a linear Minimum Mean-Square Error (MMSE) chip equalizer, w=aw' where a is a positive scaling factor, w' is the tap coefficients vector of the linear MMSE chip equalizer, $$w = R_d^{-1} h \quad (2)$$

and $R_d$ is the received signal sample correlation. Thus, $$w = a R_d^{-1} h \quad (3)$$

Recognizing that the received signal sample correlation $R_d$ is the same for all uplink G-RAKE receivers, the parent application discloses calculating $R_d$ for the union of finger delays needed by the various G-RAKE receivers in the uplink. Thus, if two G-RAKE receivers have the same finger delay pair, or have finger delay pairs of the same differential delay, they can share the same estimate of the received signal sample correlation. This may reduce or eliminate the need to calculate correlations $R_d$ for each receiver.

However, when there are a large number of a finger delay pairs according to the G-RAKE finger delays of the various receivers, estimating $R_d$ becomes computationally demanding. Additionally, using $R_d$ in G-RAKE combining weight formulation needs the additional scaling factor a to produce a maximum-likelihood (ML) symbol estimate. The computation of a consumes additional resources, such as Digital Signal Processor (DSP) computational cycles. Accordingly, the ability to efficiently estimate the impairment covariance matrix $R_u$—from which combining weights may be calculated directly according to equation (1)—with sufficient accuracy and rapidity stands as a primary challenge associated with implementation of the G-RAKE receiver.

SUMMARY OF THE INVENTION

The present invention provides a method and apparatus to estimate signal impairment correlations for a plurality of signals employing a model-based, parametric technique. In one or more exemplary embodiments, the present invention comprises a method of determining received signal impairment correlations for use in generating RAKE combining weights for a plurality of G-RAKE receivers associated with one or more signals, such interference between signals is reduced.

In one embodiment, the present invention relates to a method of processing a received multipath signal comprising a first signal and a second signal. Correlations associated with each of the first and second signals are measured. Values of fitting parameters are jointly estimated in response to measurements of correlations associated with each of the first and second signals. Received signal impairment correlations are estimated for each of the first and second signals by applying the estimated values of the fitting parameters.

In another embodiment, the present invention relates to a wireless communication receiver for use in a wireless communication network base station. The receiver includes a radio front-end circuit configured to provide a received multipath signal comprising a first signal and a second signal. The receiver also includes a receiver circuit configured to generate one or more combined signals by G-Rake processing the received signals of interest. The receiver circuit is configured to calculate combining weights by measuring correlations each associated with the first and second signals; jointly estimating values of fitting parameters in response to measurements of correlations associated with each of the first and second signals; and estimating received signal impairment correlations for each of the first and second signals by applying the estimated values of the fitting parameters.

In yet another embodiment, the present invention relates to a method of received signal processing. A multipath signal comprising at least one high-data-rate signal and at least one low-data-rate signal is received. The pilot channel associated with each high-data-rate signal is measured. Medium response estimates and measured impairment covariance matrices are computed for each high-data-rate signal. Impairment terms comprising interference and noise covariance matrices are computed. Estimates of fitting parameters are computed. Then, impairment covariance matrices are constructed for high-data-rate and/or low-data-rate signals based on the estimates of fitting parameters.

Of course, the present invention includes additional features and advantages as highlighted in the following detailed discussion. Those skilled in the art will recognize additional features and advantages upon reading that discussion, and upon viewing the accompanying drawings.

DETAILED DESCRIPTION OF THE INVENTION

Figure 1:
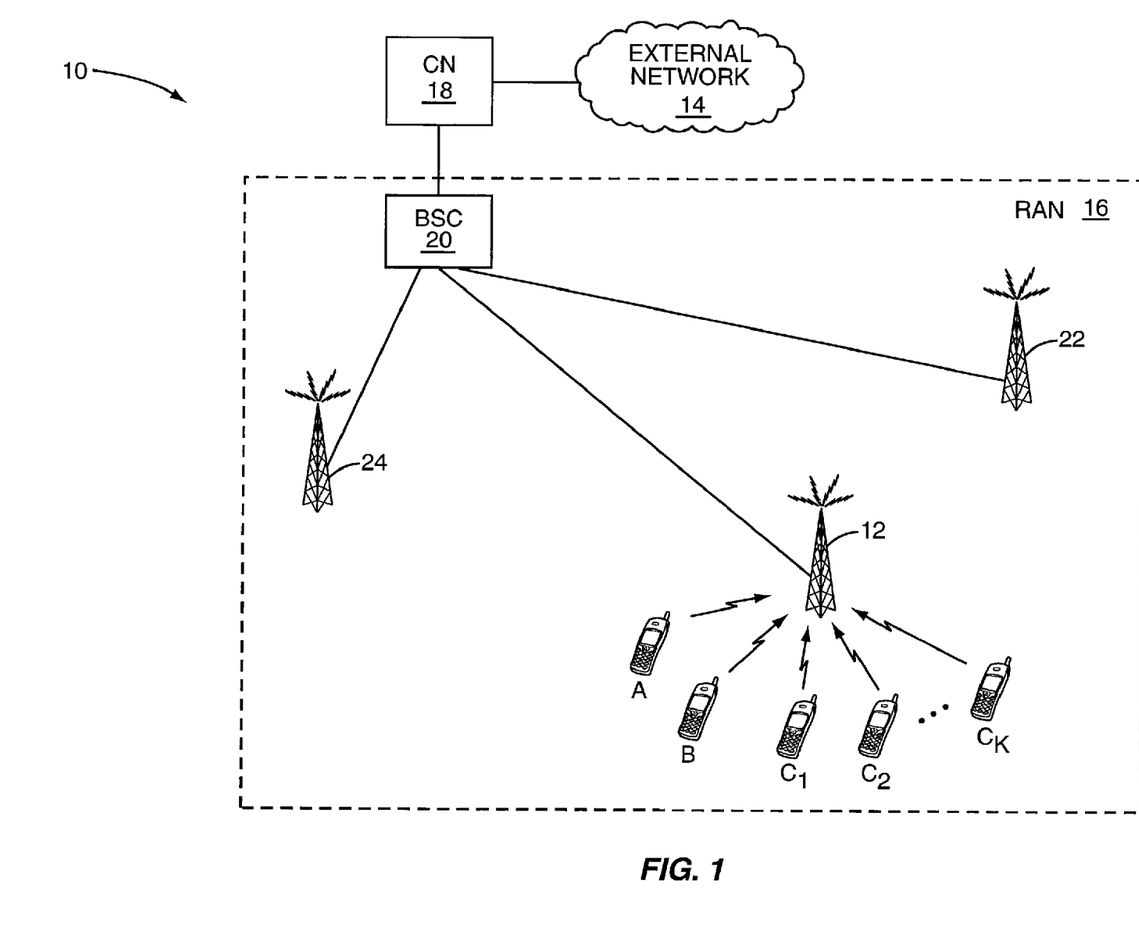
FIG. 1 is a functional block diagram of an exemplary wireless communication network.

FIG. 1 illustrates an exemplary wireless communication network 10, which may be configured as a WCDMA wireless cellular network, as an IS-95/IS-2000 wireless cellular network, or configured according to some other open or proprietary communication standard. The network 10 provides voice and data communication services to a plurality of mobile terminals A, B, $C_1, C_2, \ldots C_k$ operating within a radio service area known as a sector or cell. Those skilled in the art will appreciate that the terms "cell" and/or "sector" as used herein should be given broad construction and, in general, the term sector should be understood as identifying a given radio coverage area at a given carrier frequency. Thus, a given cell may have multiple overlaid radio sectors corresponding to multiple carrier frequencies.

The network 10 communicatively couples the mobile terminals A, B, $C_1, C_2, \ldots C_k$ to each other, to other mobile terminals in the network 10, or to one or more external networks 14, such as the Public Switched Telephone Network (PSTN), the Internet or other Public Data Networks, ISDN-based networks, or the like. Such coupling is supported by a Radio Access Network (RAN) 16, which provides the radio link(s) to the mobile terminals A, B, $C_1, C_2, \ldots C_k$, and which interfaces to one or more Core Networks (CNs) 18 that in turn link to the external networks 14. Those skilled in the art will appreciate that the particular network architecture adopted, and the entity nomenclature used varies according to the network standard involved, but such variations are not germane to understanding or explaining the present invention. Moreover, it should be understood that the illustrated network is simplified and that actual network implementations likely will have additional entities not illustrated herein for clarity.

An exemplary RAN 16 comprises one or more base stations, each typically comprising a control entity and one or more distributed radio transceiver entities. In the network 10 of FIG. 1, these entities are depicted as a Base Station Controller (BSC) or a radio network controller (RNC) 20, and a plurality of associated Radio Base Stations (RBSs) or Node B's 12, 22, 24. The mobile terminals A, B, $C_1, C_2, \ldots C_k$ are each engaged in voice or data communications via the network 10.

In particular, mobile terminals A and B are transmitting high-data-rate signals on the uplink to the RBS 12, at a concomitant high power level. Mobile terminals $C_1, C_2, \ldots C_k$ are transmitting low-data-rate signals, such as voice, on the uplink to the RBS 12, at lower power levels. As known in the art, the signals received at the RBS 12 from low-data-rate users $C_1, C_2, \ldots C_k$ may experience significant interference from the signals transmitted by high-data-rate users A and B. As used herein, the distinction between low-data-rate and high-data-rate signals is determined by a predetermined threshold. For example a data rate above 1 Mbps may be considered a high-data-rate signal. The data rate can be a granted data rate or actual transmission data rate.

In another embodiment, mobile terminals A and B correspond to terminals contributing to received signals with high received power and mobile terminals $C_1, C_2, \ldots C_k$ correspond to terminals contributing to received signals with low received power. As known in the art, the signals received at the RBS 12 from users $C_1, C_2, \ldots C_k$ may experience significant interference from the signals transmitted by users A and B. As used herein, the distinction between high received power and low received power signals is determined by the received power of the signal at the base station. In particular, a signal having a received power at or above a predetermined threshold, such as for example, 3 dB above the noise floor, is a high received power signal. All signals having a received power level below the threshold are low received power signals.

The RBS 12, or the BSC 20, referred to collectively herein as the "base station," includes a radio receiver operative to despread, demodulate, and decode radio signals received from mobile terminals A, B, $C_1$, $C_2$, ... $C_k$, which may be implemented using various processing circuits, including A/D converters, filters, DSPs or other digital processors, memory, and the like. In at least one exemplary embodiment, the base station includes one or more DSPs and/or Application Specific Integrated Circuits (ASICs), or other programmable devices, to implement a radio receiver including a parametric G-RAKE processor that generates combining weights based on parametrically estimated received signal impairment correlations. It should thus be understood that at least a portion of the present invention's functionality can be embodied as stored computer instructions in the form of micro-code, firmware, software, and the like.

As is known in the RAKE receiver arts, the output signals obtained from individual RAKE fingers can include cross-correlated "impairments." As used herein, the term "impairment" has a broad definition that includes, but is not limited to, self-interference, interference from other signals (particularly high-data-rate signals) and noise. For additional background regarding exemplary G-RAKE operations, one may refer to U.S. Pat. No. 6,714,585, RAKE COMBINING METHODS AND APPARATUS USING WEIGHTING FACTORS DERIVED FROM KNOWLEDGE OF SPREADING SPECTRUM SIGNAL CHARACTERISTICS, incorporated herein by reference in its entirety.

In the G-RAKE architecture, the combining weights used to combine the RAKE finger outputs are compensated for cross-finger correlations in one or more of these impairment terms, and the present invention provides a method and apparatus for carrying out such compensation to suppress the interference from high-data-rate signals transmitted on the same uplink, using a parametric, model-based approach.

Figure 2:
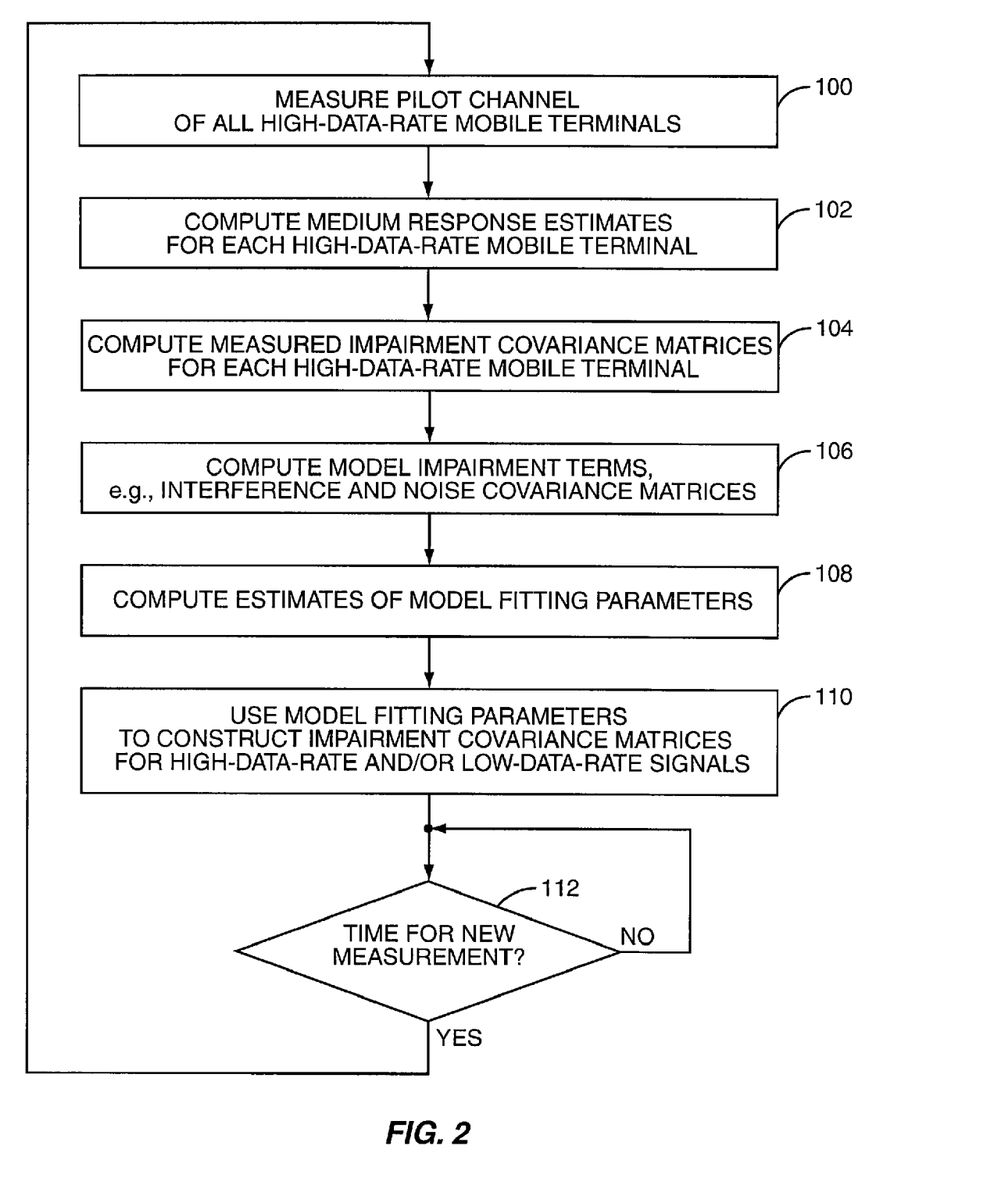
FIG. 2 is a flow diagram of received signal processing.

FIG. 2 broadly outlines an exemplary method to implement the present invention's model-based, parametric method of impairment correlation estimation for the base station of FIG. 1. As mentioned above, mobile terminals A and B are transmitting high-data-rate signals, and mobile terminals $C_1$, $C_2$, ... $C_k$ are transmitting low-data-rate signals, such as voice, on the uplink. Measurement RAKE fingers are allocated to the pilot signals (i.e., signals that include pilot symbols) of the mobile terminals A and B (i.e., the dedicated physical control channel, DPCCH) and are used to measure the pilot channels through despreading pilot signals (block 100). As used herein, a "measurement" RAKE finger is a finger assigned to despread the pilot channel (pilot and possibly detected control symbols) of a particular mobile terminal for a given set of delays. A measurement finger is distinguished from a combining RAKE finger, which despreads signals from a traffic channel of the mobile terminal.

The measurement fingers produce medium-response estimates, $\tilde{g}_A$ and $\tilde{g}_B$ (block 102) as well as the impairment covariance measurements $R'_u(A)$ and $R'_u(B)$ (block 104). The delays of the measurement fingers are determined individually according to the multipath profiles of the DPCCH signals of mobile terminals A and B. It can be shown that $R'_u(A)$ and $R'_u(B)$ can be expressed as $$R'_u(A) \approx \alpha_A R_{own}(\tilde{g}_A, \tau_A, d_A) + \alpha_B R_{other}(\tilde{g}_B, \tau_B, d_A) + \beta R_n(d_A) \quad (4)$$

$$R'_u(B) \approx \alpha_B R_{own}(\tilde{g}_B, \tau_B, d_B) + \alpha_A R_{other}(\tilde{g}_A, \tau_A, d_B) + \beta R_n(d_B) \quad (5)$$

where
$d_A$ are the measurement finger delays for mobile terminal A's DPCCH,
$d_B$ are the measurement finger delays for mobile terminal B's DPCCH,
$\tau_A = (\tau_A(0), \tau_A(1), \ldots \tau_A(L_A-1))^T$ are the multipath delays for mobile terminal A's signal,
$\tau_B = (\tau_B(0), \tau_B(1), \ldots \tau_B(L_B-1))^T$ are the multipath delays for mobile terminal B's signal,
$R_{own}(\tilde{g}_A, \tau_A, d_A)$ and $R_{own}(\tilde{g}_B, \tau_B, d_B)$ account for self-interference,
$R_{other}(\tilde{g}_B, \tau_B, d_A)$ and $R_{other}(\tilde{g}_A, \tau_A, d_B)$ account for interference from another high-data-rate mobile terminal,
$R_n(d_A)$ and $R_n(d_B)$ account for interference from other low-data-rate mobile terminals and thermal noise, and
$L_A$ and $L_B$ are the number of resolvable multipaths for signals from mobile terminals A and B, respectively.

Equations (4) and (5) comprise models or fitting equations of received signal impairment correlations for high-data-rate signals, each model comprising a separate impairment term ($R_{own}(*)$, $R_{other}(*)$) associated with each high-data-rate signal (A, B), each impairment term scaled by a corresponding model fitting parameter ($\alpha_A$, $\alpha_B$). The models further comprise a noise impairment term ($R_n(*)$) scaled by a corresponding model fitting parameter ($\beta$). According to one embodiment, a method of determining received signal impairment correlations for use in received signal processing comprises estimating each of the model fitting parameters ($\alpha_A$, $\alpha_B$, $\beta$) responsive to measurements of the received signal impairment correlations ($R'_u(A)$ and $R'_u(B)$) associated with each high-data-rate signal (A, B), and using the model fitting parameter estimates to construct impairment covariance matrices for all signals by applying the estimates to a model of received impairment correlations for the low-data-rate signals (as discussed below). Note: additional fitting equations may be generated corresponding to low-rate users (similar to (11), but replacing the left hand side of equation with measured impairment correlation).

Those of skill in the art will appreciate that providing the models of received signal impairment correlations and estimating model fitting parameters based on measured channel properties in this context may comprise configuring a Digital Signal Processor (DSP), microprocessor, or other processing logic, to implement an impairment correlation model and estimate model fitting parameters thereof according to stored computer instructions.

Considering the models in greater detail, the element of $R_{own}(\tilde{g}_A, \tau_A, d_A)$ corresponding to delays $d_A(i)$ and $d_A(j)$ can be expressed as:

$$r_{own}(d_A(i), d_A(j)) = \sum_{l_1=0}^{L_A-1}\sum_{l_2=0}^{L_A-1} \tilde{g}_A(l_1)\tilde{g}_A^*(l_2) \sum_{m \neq 0} R_p(d_A(i) - mT_c - \tau_A(l_1))R_p(d_A(j) - mT_c - \tau_A(l_2)), \quad (6)$$

where $R_p(t)$ is the autocorrelation function of the chip waveform.

The element of $R_{other}(\tilde{g}_B, \tau_B, d_A)$ corresponding to delays $d_A(i)$ and $d_A(J)$ can be expressed as:

$$r_{other}(d_A(i), d_A(j)) = \sum_{l_1=0}^{L_B-1}\sum_{l_2=0}^{L_B-1} \tilde{g}_B(l_1)\tilde{g}_B^*(l_2) \quad (7)$$

-continued $$\sum_m R_p(d_A(i) - mT_c - \tau_B(l_1))R_p(d_A(j) - mT_c - \tau_B(l_2))$$

Similarly, the elements of $R_{own}(\tilde{g}_B,\tau_B,d_B)$ and $R_{other}(\tilde{g}_A,\tau_A,d_B)$ corresponding to delays $d_B(i)$ and $d_B(j)$ are:

$$r_{own}(d_B(i), d_B(j)) = \sum_{l_1=0}^{L_B-1}\sum_{l_2=0}^{L_B-1} \tilde{g}_B(l_1)\tilde{g}_B^*(l_2) \quad (8)$$

$$\sum_{m \neq 0} R_p(d_B(i) - mT_c - \tau_B(l_1))R_p(d_B(j) - mT_c - \tau_B(l_2))$$

$$r_{other}(d_B(i), d_B(j)) = \sum_{l_1=0}^{L_A-1}\sum_{l_2=0}^{L_A-1} \tilde{g}_A(l_1)\tilde{g}_A^*(l_2) \quad (9)$$

$$\sum_m R_p(d_B(i) - mT_c - \tau_A(l_1))R_p(d_B(j) - mT_c - \tau_A(l_2))$$

For fingers assigned to the same receive antenna, the element of $R_n(d)$ corresponding to finger delays $d_1$ and $d_2$ is:

$$r_n(d_1,d_2) = R_p(d_1-d_2). \quad (10)$$

Elements of $R_n(d)$ corresponding to fingers assigned to different receive antennas have values 0.

The impairment covariance measurements $R'_u(A)$ and $R'_u(B)$ as well as medium-response estimates $\tilde{g}_A$ and $\tilde{g}_B$ are obtained from the measurement fingers allocated to pilot signals from mobile terminals A and B. The relevant finger delays d and path delays T are obtained from measurement and/or combining fingers. With these measured quantities, the terms $R_{own}(\tilde{g}_A,\tau_A,d_A)$, $R_{other}(\tilde{g}_B,\tau_B,d_A)$, $R_{own}(\tilde{g}_B,\tau_B,d_B)$, $R_{other}(\tilde{g}_A,\tau_A,d_B)$, $R_n(d_A)$ and $R_n(d_B)$ are solved using equations (4)-(10) (block 106). Only the model fitting parameters $\alpha_A$, $\alpha_B$, and $\beta$ remain unknown. These can be solved using a joint Least Squares Estimation (LSE) process (block 108).

The model fitting parameters, or scaling factors, $\alpha_A$, $\alpha_B$, and $\beta$ can be shown to be:

$$\alpha_A = E_c(A)/E_p(A)$$

$$\alpha_B = E_c(B)/E_p(B)$$

$$\beta = N_o$$

where $E_c(k)$ and $E_p(k)$ are the total received chip energy and pilot symbol energy, respectively, from user k, and $N_o$ is the one-sided noise power spectral density. Here, the power of other low-data-rate signals is folded into $N_o$. The normalization of $E_p(k)$ in $\alpha_k$ is needed because the estimated medium response $\tilde{g}_k$ is scaled by the square-root of $E_p(k)$. As a result, $R_{own}(\tilde{g}_A,\tau_A,d_A)$, $R_{other}(\tilde{g}_B,\tau_B,d_A)$, $R_{own}(\tilde{g}_B,\tau_B,d_B)$, $R_{other}(\tilde{g}_A,\tau_A,d_B)$ are all scaled by either $E_p(A)$ or $E_p(B)$.

According to one embodiment of the present invention, the least-squares solutions $\tilde{\alpha}_A$, $\tilde{\alpha}_B$, $\tilde{\beta}$ of the model fitting parameters are used to construct the impairment covariance matrices needed by the G-RAKE receivers intended for high-data-rate signals (A & B) and/or low-data-rate signals ($C_1, C_2, \ldots C_k$) (block 110). Let $R_u(k)$ denote the impairment covariance matrix for the G-RAKE receiver intended for the kth uplink signal. For the low-data-rate signals, $$R_u(C_k) = \tilde{\alpha}_A R_{other}(\tilde{g}_A,\tau_A,d_k) + \tilde{\alpha}_B R_{other}(\tilde{g}_B,\tau_B,d_k) + \tilde{\beta} R_n(d_k). \quad (11)$$

RAKE combining weights for demodulating the low-data-rate signals are then generated using the impairment covariance matrix, as known in the art. For high-data-rate signals A and B, the impairment covariance matrices for the G-RAKE receiver can be estimated as $$R_u(A) = \tilde{\alpha}_A R_{own}(\tilde{g}_A,\tau_A,d_A) + \tilde{\alpha}_B R_{other}(\tilde{g}_B,\tau_B,d_A) + \tilde{\beta} R_n(d_A)$$

$$R_u(B) = \tilde{\alpha}_B R_{own}(\tilde{g}_B,\tau_B,d_B) + \tilde{\alpha}_A R_{other}(\tilde{g}_A,\tau_A,d_B) + \tilde{\beta} R_n(d_B).$$

RAKE combining weights for demodulating the high-data-rate signals are then generated using these impairment covariance matrices, as known in the art.

The inventive process of FIG. 2 may be repeated as desired or required, and in one embodiment may be regularly scheduled (block 112), for example, every WCDMA time slot or in every sub-frame (i.e., a few time slots). Those of skill in the art will recognize that performing the calculations more often will allow the base station receiver to more dynamically track changing channel conditions (i.e., changes in interference from high-data-rate users as well as fading and the like). On the other hand, the process is computationally demanding, and repeating it more often than necessary may be counter-productive. Furthermore, not all terms may require updating at the same rate. For example, the thermal noise characteristics typically do not change significantly from slot to slot and thus can be updated more slowly. Those of skill in the art may determine the optimal update frequency for the model fitting parameters for any given implementation. In one or more embodiments, the values of the model fitting parameters may be filtered or smoothed by successive estimations of the instantaneous values of the parameters, such that the models dynamically track changing channel conditions and interference.

The situation of FIG. 1—with two mobile terminals A and B transmitting high-data-rate signals and a plurality of mobile terminals $C_1, C_2, \ldots C_k$ transmitting low-data-rate signals—is, of course, exemplary only, and not limiting. The model-based method of interference suppression of the present invention can easily be extended to cases with more than two mobile terminals transmitting high-data-rate signals by adding an additional $R_{other}$ term in equations (4), (5), and (11) for each such high-data-rate signal. The method may also be adapted to the case of only one high-data-rate signal. In this case, the $R_{other}$ term in equation (4) is omitted and equation (5) is not necessary. Additionally, only one $R_{other}$ term would appear in equation (11).

In this manner, the model fitting parameters $\alpha_A$, $\alpha_B$, $\beta$ are estimated in response to measurements of the received signal impairment correlations ($R'_u(A)$ and $R'_u(B)$) and used to construct impairment covariance matrices for all signals. This approach is demonstrated diagrammatically in FIG. 3. Measurement fingers 200, 202 are allocated to high-data-rate mobile terminals A and B. A joint fitting parameter estimation unit 204, such as an appropriately programmed DSP or the like, generates estimates of the model fitting parameters $\tilde{\alpha}_A$, $\tilde{\alpha}_B$, and $\tilde{\beta}$ which are provided to G-RAKE receivers 206, 208 allocated to the high-data-rate signals A and B, and also provided to G-RAKE receivers 210, 212 allocated to low-data-rate signals $C_1, C_2, \ldots$ and $C_k$.

Figure 3:
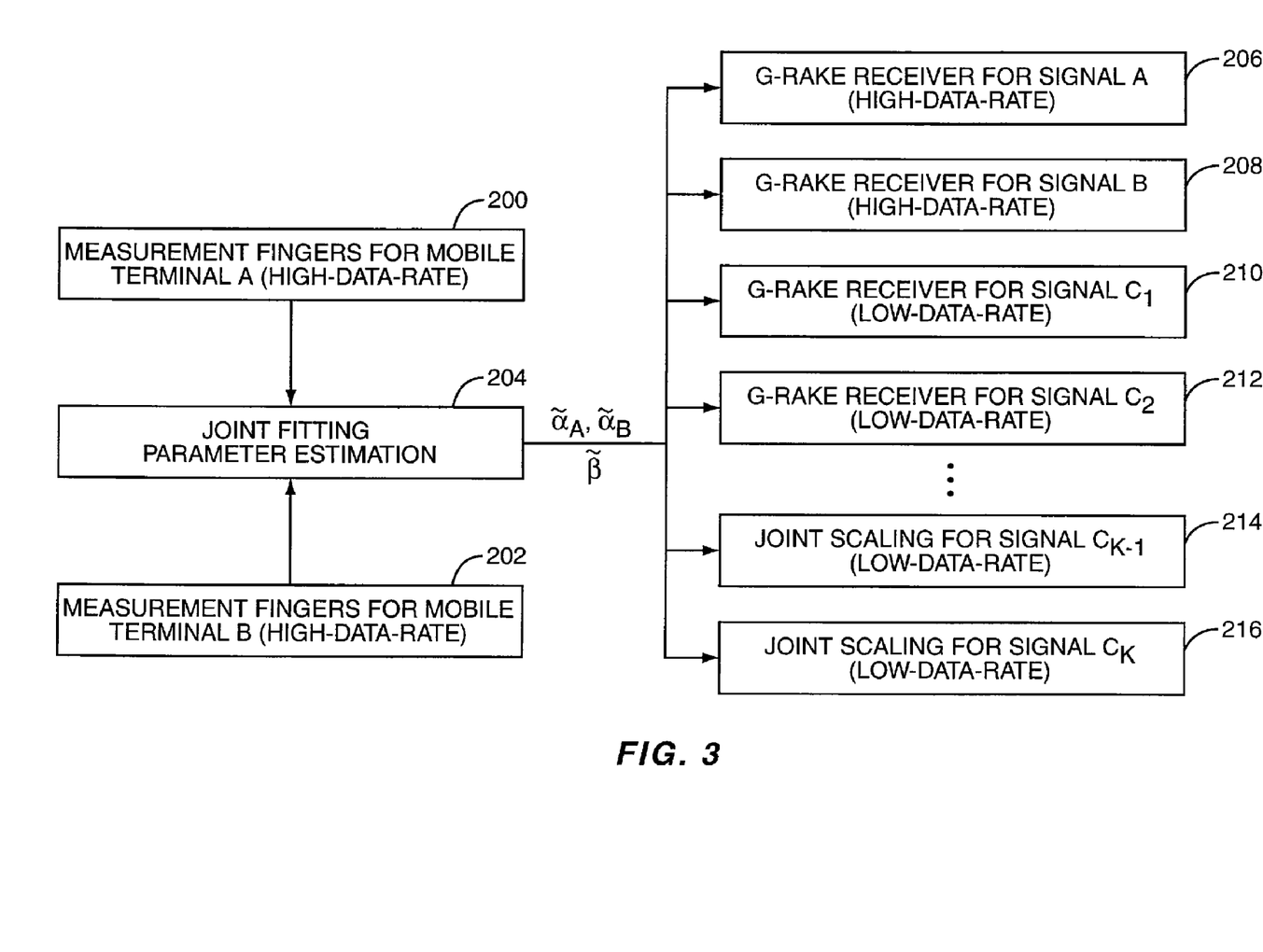
FIG. 3 is a functional block diagram depicting the parametric nature of various demodulation techniques according to embodiments of the present invention.

As FIG. 3 indicates, demodulation approaches other than G-RAKE receivers may advantageously utilize the model fitting parameter estimates $\tilde{\alpha}_A$, $\tilde{\alpha}_B$, and $\tilde{\beta}$ to suppress interference in low-data-rate signals. Referring to equation (1) above, and using hats to denote estimates, the combining weights for the G-RAKE receiver for a low-data-rate signal $C_n$ is $$w = \hat{R}^{-1}\hat{h} \quad (12)$$

where h is the net channel response for user $C_n$ and R is given by equation (11). It is assumed that the net response is estimated using a standard, correlation-based approach.

Joint scaling for user $C_n$ considers the estimation error in the net channel response by modeling it as $$\hat{h} = h + e \quad (13)$$

where h is the vector of true fading coefficients assumed to be Rayleigh faded with covariance $R_h$. The term e is the estimation error assumed to have covariance $(1/K_p)R$, where $K_p$ depends on the smoothing factor used during channel estimation.

There are several forms of joint scaling. Here we consider the form in which the combining weights are given by $$w = R^{-1} R_h (R_h + (1/K_p)R)^{-1} \hat{h} \quad (14)$$

Thus, in addition to sharing parameter estimates from users A and B to determine R, the demodulator for user $C_n$ also requires an estimate of $R_h$. This can be obtained using the techniques described in U.S. patent application Ser. No. 10/672,127, METHOD AND APPARATUS FOR COMBINING WEIGHT COMPUTATION IN A DS-CDMA RAKE RECEIVER, filed Sep. 26, 2003, assigned to the assignee of the present application and incorporated herein by reference in its entirety.

In some cases, it may be advantageous to work with the medium response g for user $C_n$ rather than the net response. The net and medium responses are related by $$h = Bg \quad (15)$$

where B depends on the transmit and receive filter responses, assumed known or estimated. In this case, $$R_h = B R_g B^H \quad (16)$$

where $R_g$ is the correlation matrix for g. $R_g$ can be approximated as a diagonal matrix and the diagonal elements can be estimated from averaging the magnitude-square values of h and subtracting off the impairment power obtained from $(1/K)R$, as described in U.S. patent application Ser. No. 11/538,074, ENHANCED PARAMETRIC G-RAKE RECEIVER, filed concurrently herewith, assigned to the assignee of the present application and incorporated herein by reference in its entirety.

Accordingly, demodulators for low-data-rate signals may use different demodulation approaches, such as RAKE, G-RAKE, joint scaling, or the like, utilizing the shared model fitting parameters obtained from the measured impairment correlations of the high-data-rate signals. This is indicated in FIG. 3, where low-data-rate signals $C_1$ and $C_2$ are demodulated by G-RAKE receivers 210, 212, and low-data-rate signals $C_{k-1}$ and $C_k$ are demodulated by joint scaling units 214, 216.

Figure 4:
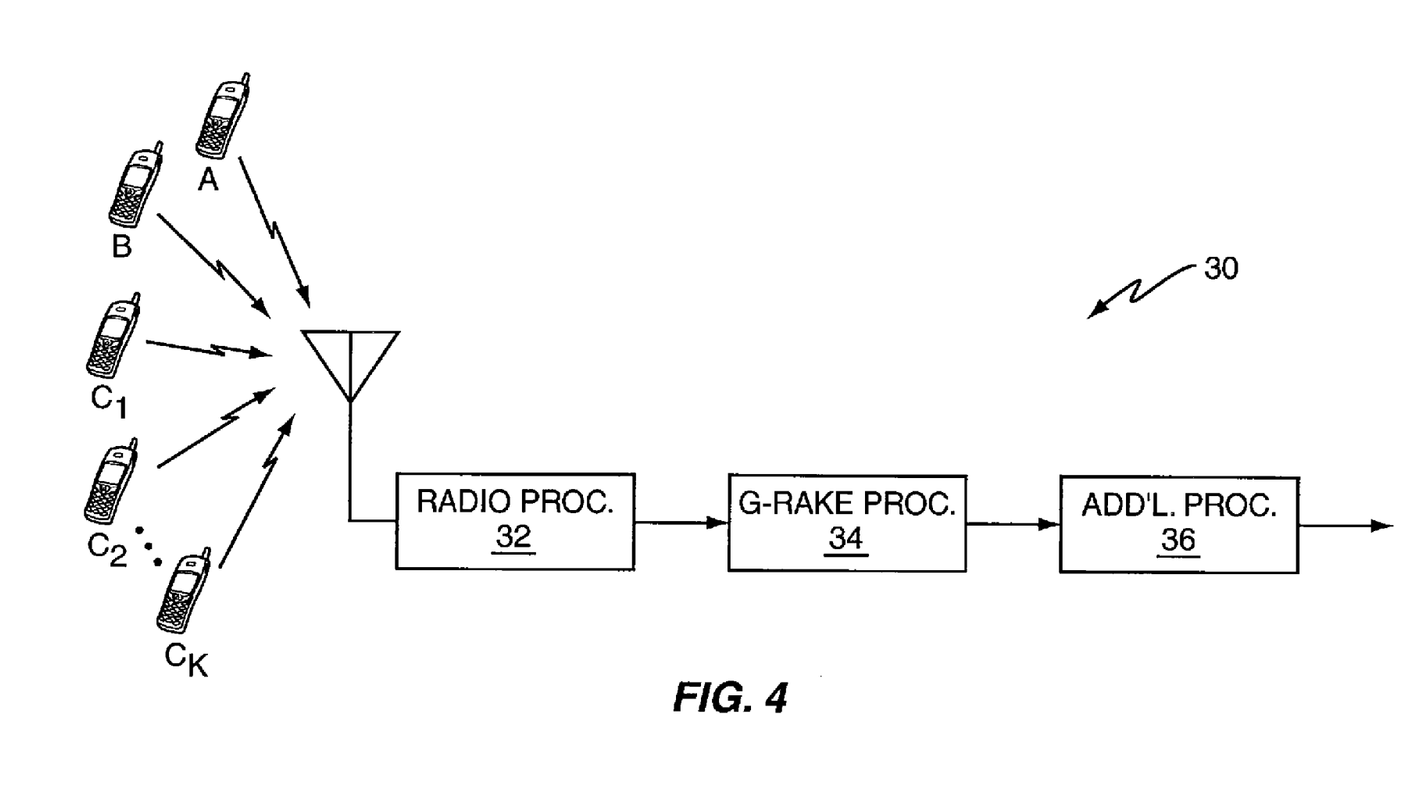
FIG. 4 is a functional block diagram of a plurality of transmitters and a receiver including an inventive Generalized RAKE processor circuit.

With the above exemplary embodiments in mind, FIG. 4 broadly illustrates mobile terminals A, B, $C_1$, $C_2$, ... $C_k$, transmitting on the uplink to a receiver 30 at a base station. The mobile terminals A, B, $C_1$, $C_2$, ... $C_k$ each use spread-spectrum modulation to transmit spread-spectrum signals including a traffic signal and a pilot signal. As above, mobile terminals A and B transmit high-data-rate signals, and the mobile terminals $C_1$, $C_2$, ... $C_k$ transmit low-data-rate signals. The signals pass through a radio channel and are received at one or more antennas of the receiver 30. Thus, receiver 30 receives the transmitted signals plus noise and interference, and a radio processor 32 generates received signal samples, r, from that corrupted received signal. While the details of radio processor 32 in at least some embodiments will be familiar to those skilled in the art, an exemplary radio processor 32 comprises filtering and conversion circuits, e.g., analog-to-digital converters, such that the received signal is represented by a series of digitized baseband signal samples input to a G-RAKE processor 34. In turn, processor 34 demodulates the received signal samples to produce soft values or bit estimates. These estimates are provided to one or more additional processing circuits 36 for further processing, such as forward-error-correction (FEC) decoding and conversion into speech, text, or graphical images, etc. Those skilled in the art will recognize that the particular information type(s) carried by the received signal and the particular processing steps applied by receiver 30 are a function of its intended use and type. Processor 34 also estimates received signal quality by producing SIR estimates that also are based on the modeled impairments.

Figure 5:
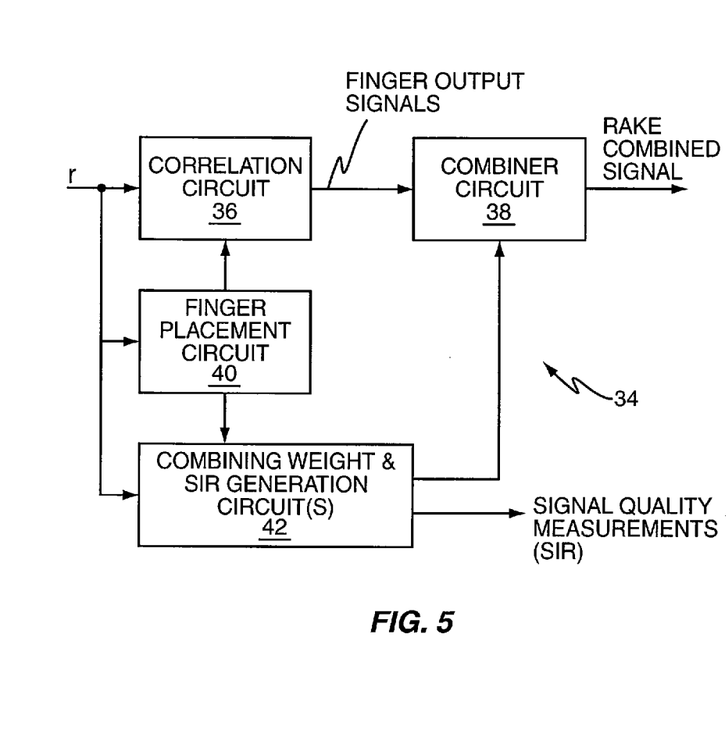
FIG. 5 is a functional block diagram of the G-RAKE processor of FIG. 4.

FIG. 5 illustrates an exemplary G-RAKE processor 34 comprising a correlation circuit 36, a combiner circuit 38, a finger placement circuit 40, and a combining weight and SIR estimate generation circuit 42. In operation, received samples are provided to the finger placement circuit 40, which determines the delays to use in correlating the received signal samples to the traffic spreading sequences. These delays are used in correlation circuit 36 to delay either the received signal sample stream or the spreading codes used by the individual RAKE fingers in the correlation circuit 36 to produce traffic correlation values according to the various finger placements. The delays as well as measurement delays are also provided to the combining weight and SIR estimate generation circuit 42, which computes the RAKE combining weights used to combine the RAKE finger output signals from the correlation circuit 36. It also computes an SIR estimate. The finger output signals from correlation circuit 36 are combined using the combining weights in the combiner 38, producing combined values or soft bit values.

An exemplary correlation circuit 36 comprises a plurality of correlation units, also referred to herein as RAKE fingers, and each correlation unit can be placed at a desired relative time offset with respect to the received signal using correlation code offsets and/or adjustable delay elements, such as buffers. In exemplary G-RAKE operation, finger placement circuit 40 controls correlation circuit 36 such that one or more RAKE fingers are time aligned with the relative path delays of selected signal images in the received signal (on-path fingers) and, typically, one or more of the RAKE fingers are placed off-path. One or more measurement fingers are also allocated to despread the pilot signals of high-data-rate mobile terminals A and B (correlation circuit 46 in FIG. 6). The G-RAKE processor 34 can be configured to adjust the alignment of on-path and/or off-path RAKE fingers dynamically to maximize the SNR of the RAKE combined signal output from the combiner circuit 38.

Figure 6:
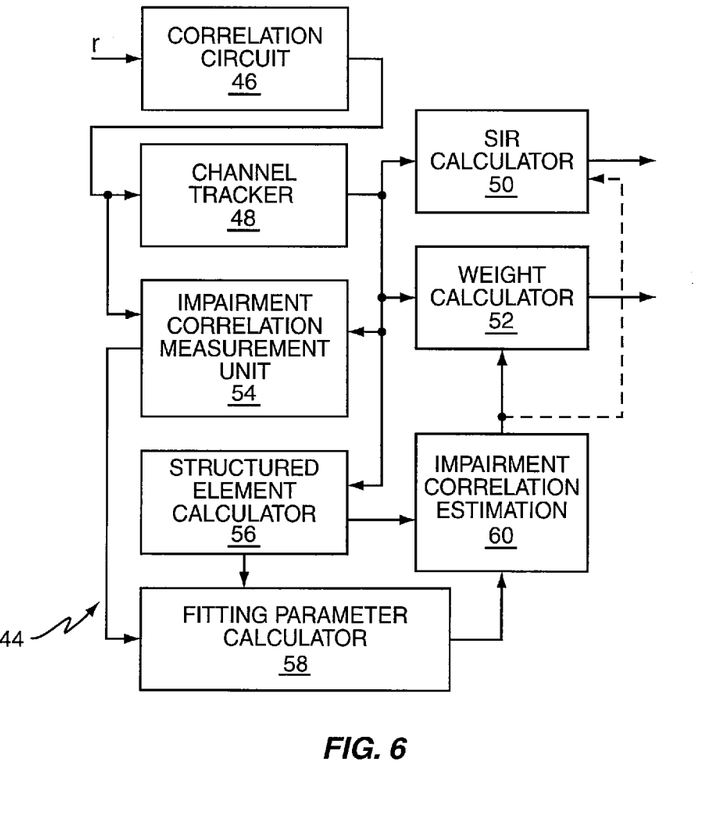
FIG. 6 is a functional block diagram of an exemplary combining weight and SIR generator included in the circuit of FIG. 5.

On that point, G-RAKE processor 34 offers improved performance compared to conventional RAKE receivers under at least some reception conditions by considering the effects of received signal impairment correlations between the RAKE fingers in its generation of the RAKE combining weights. Of course, in the context of the present invention, combining weight generation benefits from the use of parametrically modeled impairment correlations. To that end, FIG. 6 illustrates an exemplary combining weight and SIR generation circuit 42 that is configured to generate RAKE combining weights according to one or more exemplary embodiments of parametric, model-based signal impairment compensation.

According to the illustration, circuit 42 comprises a correlation circuit 46, a channel tracker circuit 48, a SIR calculator 50, a combining weight calculation circuit 52, an impairment correlation measurement circuit 54, a structured element calculation circuit 56, a model fitting parameter calculation circuit 58, and an impairment correlation estimation circuit 60.

In operation, the received samples are provided to correlation circuit 46, which correlates the received samples to a pilot or other reference signal spreading sequence, and removes symbol modulation producing pilot correlation values. The channel tracker circuit 48 receives these pilot correlations and uses them to estimate or otherwise track channel coefficients for the received signal. These coefficients are provided to measurement circuit 54, which also receives the pilot correlations. Circuit 54 is configured to obtain impairment samples, i.e., impairment measurements for the received signal, by subtracting channel estimates from the pilot correlations and is further configured to calculate impairment correlation measurements by correlating the impairment samples with each other and with themselves.

Structured element calculation circuit 56 receives the channel estimates and uses them to construct the elements corresponding to the impairment terms $R_{own}$ and $R_{other}$ of the impairment models associated with high-data-rate signals, which are referred to herein as structured elements or impairment correlation terms. The impairment correlation measurements, i.e., matrices $R'_u(A)$ and $R'_u(B)$, and the structured elements are provided to the model fitting parameter calculation circuit 58, which uses them to estimate the model fitting parameters $\tilde{\alpha}_A$, $\tilde{\alpha}_B$, and $\tilde{\beta}$. The fitting parameters and the structured elements are provided to the impairment correlation estimation circuit 60, which produces the estimated impairment correlation matrix $R_u(k)$ associated with the signals of interest. The channel estimates and the estimated impairment correlation matrix are provided to the weight calculation circuit 52, which produces the combining weights to be used by combiner circuit 38 in combining the finger output signals from correlation circuit 36. The channel estimates and the estimated impairment correlation matrix are also provided to the SIR calculator 42, which produces a SIR estimate for power control or rate adaptation purposes.

In general, the elements of the inventive G-RAKE processor 34 and combining weight and SIR generation circuit 42 of the present invention can be implemented in hardware, software, or essentially any combination thereof, according to the needs of particular design. Indeed, the present invention is not limited by the foregoing discussion or by the accompanying figures but only by the following claims and the reasonable equivalents thereof. Furthermore, although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of processing two or more received multipath signals comprising at least a first signal and a second signal, each of the first and second signals including possible multipath interference, the method comprising:
    measuring correlations of signal impairments, each associated with the first and second signals;
    jointly estimating values of fitting parameters in response to the measurements of correlations of signal impairments associated with each of the first and second signals; and
    estimating received signal impairment correlations for each of the first and second signals by applying the estimated values of the fitting parameters.

2. The method of claim 1 wherein the two or more received multipath signals further comprise a third signal and further comprising estimating received signal impairment correlations for the third signal by applying the estimated values of the fitting parameters.

3. The method of claim 1 wherein measuring impairment correlations comprises despreading pilot symbols.

4. The method of claim 1 wherein estimating received signal impairment correlations for each of the first and second signals by applying the estimated values of the fitting parameters further comprises forming a noise impairment term scaled by a corresponding fitting parameter.

5. The method of claim 4 wherein the noise impairment term comprises a correlation matrix that models the autocorrelation properties of receiver filtering.

6. The method of claim 1 wherein estimating received signal impairment correlations for each of the first and second signals by applying the estimated values of the fitting parameters comprises forming interference correlation matrices, and wherein elements of the interference correlation matrices are determined from channel estimates corresponding to pilot signals from the first and second signals.

7. The method of claim 1 wherein jointly estimating values of fitting parameters in response to measurements of correlations associated with each of the first and second signals comprises performing a least squares fit of the fitting parameters to make the weighted sum of interference and noise correlation matrices closely match measured impairment correlations.

8. The method of claim 1 wherein each received signal impairment correlation estimate comprises a separate interference covariance matrix scaled by a corresponding fitting parameter for the first and second signals and a noise covariance matrix scaled by a noise term fitting parameter.

9. The method of claim 8 wherein the elements of each interference covariance matrix are based on medium-response estimates, current finger delay assignments, and current received signal path delays.

10. The method of claim 8 wherein the elements of the noise covariance matrix are based on an autocorrelation function of a received signal filter pulse and on current finger delay assignments.

11. The method of claim 1 further comprising generating combining weights for one or more signals based on the determined received signal impairment correlations.

12. The method of claim 1 further comprising demodulating one or more signals based on the determined received signal impairment correlations using a joint scaling demodulation.

13. The method of claim 12 wherein the joint scaling demodulation is operative to suppress interference in the channel estimates as well as the data estimates.

14. The method of claim 12 wherein the joint scaling demodulation utilizes the net channel response.

15. The method of claim 12 wherein the joint scaling demodulation utilizes the medium response.

16. The method of claim 1 further comprising generating G-RAKE combining weights for a first signal, and demodulating a second signal using joint scaling demodulation, both based on the determined fitting parameters.

17. A wireless communication receiver for use in a wireless communication network base station, comprising:
    a radio front-end circuit configured to provide two or more received multipath signals comprising at least a first signal and a second signal, each of the first and second signals including possible multipath interference; and a receiver circuit configured to generate one or more combined signals from despreading the received signals of interest;

said receiver circuit configured to calculate combining weights by:

measuring correlations of signal impairments, each associated with the first and second signals;

jointly estimating values of fitting parameters in response to measurements of correlations of signal impairments associated with each of the first and second signals; and estimating received signal impairment correlations for each of the first and second signals by applying the estimated values of the fitting parameters.

18. The receiver of claim 17 wherein the two or more received multipath signals further comprise a third signal and wherein the receiver circuit is further configured to estimate received signal impairment correlations for the third signal by applying the estimated values of the fitting parameters.

19. The receiver of claim 17 wherein estimating received signal impairment correlations for each of the first and second signals by applying the estimated values of the fitting parameters comprises forming one or more interference correlation matrices, each scaled by a corresponding fitting parameter, wherein elements of the interference correlation matrices are determined from channel estimates corresponding to pilot signals from the first and second signals, and forming a noise correlation matrix, scaled by a corresponding fitting parameter, that models the autocorrelation properties of receiver filtering.

20. The receiver of claim 19 wherein jointly estimating values of fitting parameters in response to measurements of correlations associated with each of the first and second signals comprises performing a least squares fit of the fitting parameters to make the weighted sum of interference and noise correlation matrices closely match measured impairment correlations.

21. The receiver of claim 19 wherein the elements of each interference correlation matrix are based on medium-response estimates, current finger delay assignments, and current received signal path delays.

22. The receiver of claim 19 wherein the elements of the noise correlation matrix are based on an autocorrelation function of a received signal filter pulse and on current finger delay assignments.

23. The receiver of claim 17 wherein the receiver circuit is further configured to calculate combining weights based on the determined received signal impairment correlations.

24. The receiver of claim 17 further comprising demodulating one or more signals based on the determined received signal impairment correlations using a joint scaling demodulation.

25. A method of received signal processing comprising:

receiving a multipath signal comprising at least one high-data-rate signal and at least one low-data-rate signal;

measuring the pilot channel associated with each received high-data-rate signal;

computing medium response estimates for each received high-data-rate signal;

computing measured impairment covariance matrices for each received high-data-rate signal;

computing impairment correlation terms comprising signal interference and noise covariance matrices;

computing estimates of fitting parameters; and constructing impairment covariance matrices for high-data-rate and/or low-data-rate signals based on the estimates of fitting parameters.

26. The method of claim 25 wherein computing estimates of fitting parameters comprises performing a least squares fit of the fitting parameters to make the weighted sum of interference and noise covariance matrices closely match measured impairment correlations.

27. The method of claim 25 further comprising generating combining weights based on the signal impairment terms using the estimates of the fitting parameters.

28. The method of claim 27 further comprising generating G-RAKE combining weights for a first low-data-rate signal, and demodulating a second low-data-rate signal using joint scaling demodulation, both based on the determined received signal impairment correlations.

* * * * *

UNITED STATES PATENT AND TRADEMARK OFFICE
CERTIFICATE OF CORRECTION

PATENT NO. : 8,275,023 B2
APPLICATION NO. : 11/609395
DATED : September 25, 2012
INVENTOR(S) : Wang et al.

Page 1 of 1

It is certified that error appears in the above-identified patent and that said Letters Patent is hereby corrected as shown below:

In Column 2, Line 37, in Equation (2), delete "w=" and insert -- w'= --, therefor.

In Column 6, Line 60, delete "$d_A$ (J)" and insert -- $d_A$ (j) --, therefor.

In Column 7, Line 33, delete "T" and insert -- $\tau$ --, therefor.

Signed and Sealed this
Twelfth Day of February, 2013

Teresa Stanek Rea
*Acting Director of the United States Patent and Trademark Office*